Mar. 3, 1925.　　　　　　　　　　　　　1,528,554
S. F. KLOHS
AUTOMOBILE HEADLIGHT
Filed Nov. 1, 1923　　　　　3 Sheets-Sheet 2
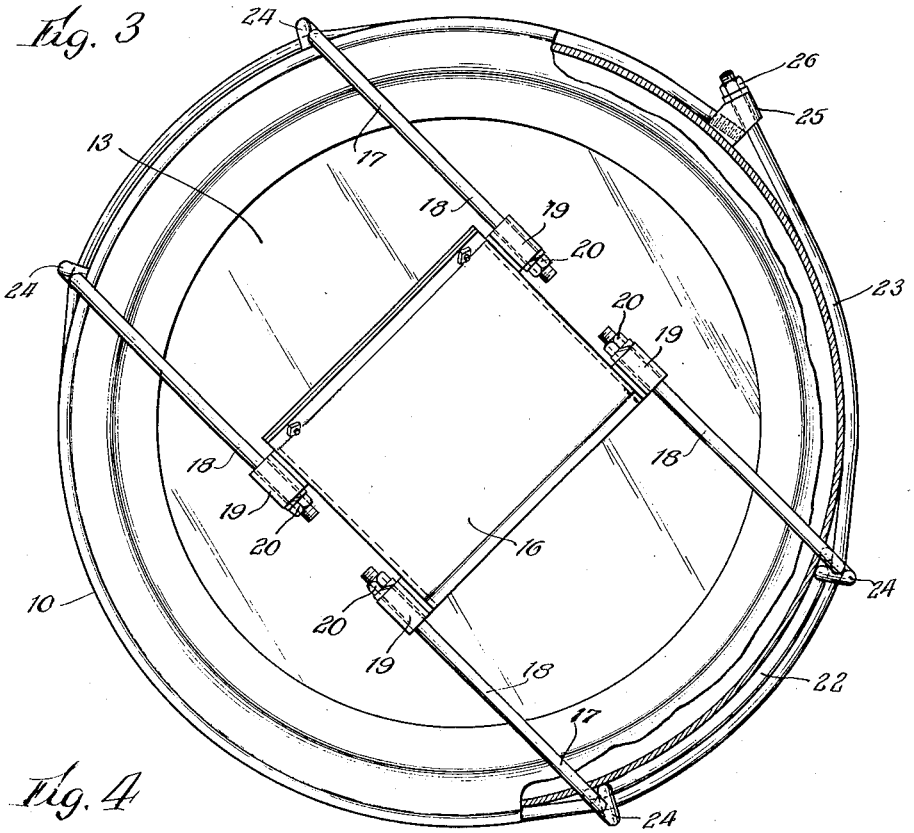
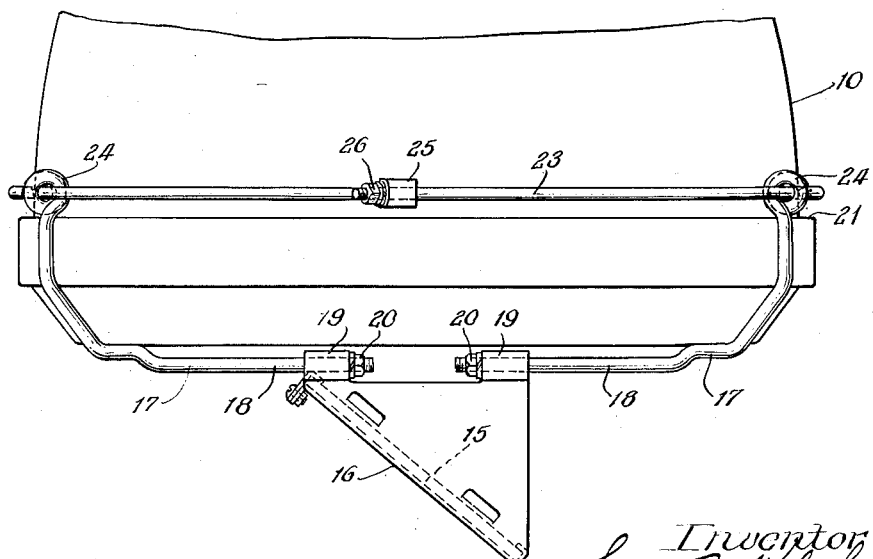

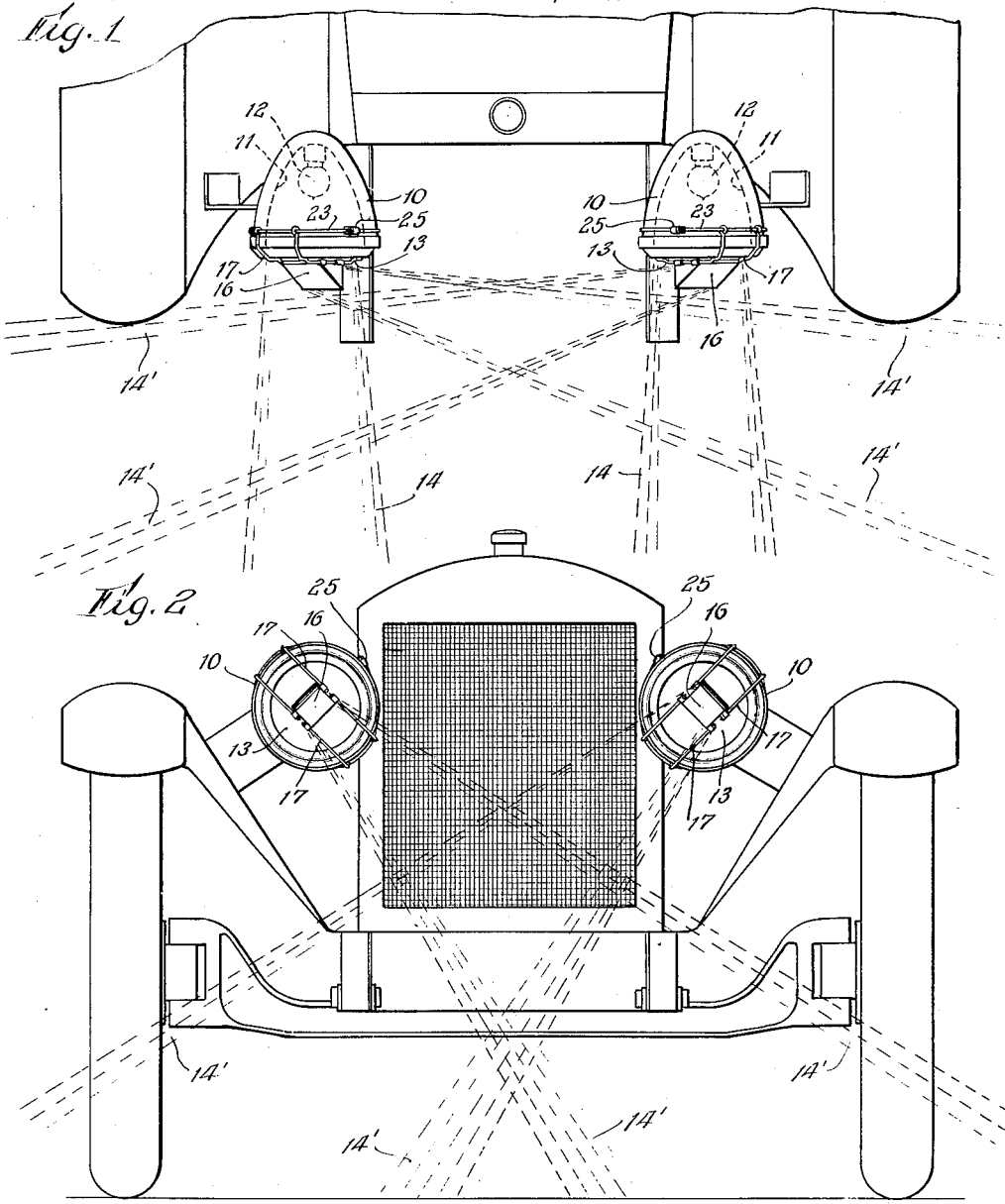

Mar. 3, 1925.

S. F. KLOHS

AUTOMOBILE HEADLIGHT

Filed Nov. 1, 1923

Inventor:
Sam F. Klohs
By: Wm O Beltatty

Patented Mar. 3, 1925.

1,528,554

UNITED STATES PATENT OFFICE.

SAM F. KLOHS, OF PALOS PARK, ILLINOIS.

AUTOMOBILE HEADLIGHT.

Application filed November 1, 1923. Serial No. 672,063.

*To all whom it may concern:*

Be it known that I, SAM F. KLOHS, a citizen of the United States, residing at Palos Park, in the county of Cook and State of Illinois, have invented certain new and useful Improvements in Automobile Headlights, of which the following is a specification.

The object of my invention is broadly to provide a vehicle headlight which will project a beam of light at an angle to the direction in which the vehicle is traveling so that the road to the side of the vehicle will be illuminated to facilitate driving.

Another object is to provide an improved headlight which will project a lateral beam of light in addition to the forward beam of light projected by the usual lens of the headlight.

A further object is to provide a vehicle headlight which will project a plurality of beams of light simultaneously, one of the beams illuminating the roadway in front of the vehicle, and the other beam illuminating the side of the road and a branch road into which the vehicle may be turning.

A further object is to provide means of simple construction adapted to be detachably secured to a vehicle headlight for projecting a beam of light at an angle to the beam projected by the usual lens of the headlight.

And a further object of the invention is to provide a reflector adapted to be movably secured to a vehicle headlight so that it can be easily adjusted to a desired position for throwing a beam of light independently of the main beam of the headlight.

Fig. 1 is a fragmentary plan view of an automobile having headlights embodying my invention in one form.

Fig. 2 is a front elevation of the automobile and headlights shown in Fig. 1.

Fig. 3 is an enlarged front view of one of the headlights shown in Figs. 1 and 2, parts of the headlight being broken away to illustrate certain details of construction.

Fig. 4 is a plan view of Fig. 3.

Figure 5:
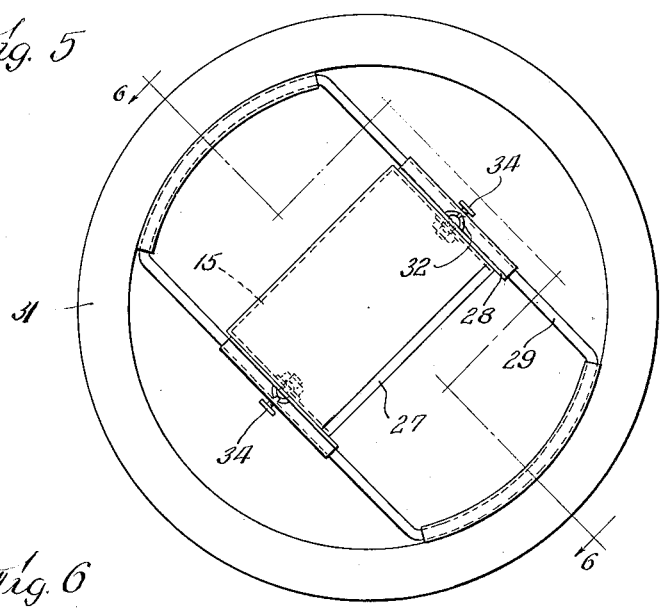
Fig. 5 is an elevation.

Referring to Figs. 1 and 2, 10 designates each of a pair of headlights of any suitable make which are fixedly secured with respect to the chassis of the automobile in contrast with the so-called "dirigible" headlights. Each headlight 10 preferably comprises a substantially parabolic reflector 11, a suitable lamp such as an electric light bulb 12, and a lens 13, all being of the type commonly employed for illuminating the roadway in advance of a vehicle. In Fig. 1 I have indicated at 14 several rays of light which are projected from the lenses 13. It is apparent that these rays would only illuminate the roadway directly in front of the vehicle, leaving the roadway to the side of the vehicle in comparative darkness. This method of illumination has its disadvantages when a turn is to be made for the driver must turn from a brightly illuminated path into a dark path.

By this means the headlight performs the principal function of a dirigible headlight, namely, to illuminate the sides of the road, without the expense of such a headlight.

My invention comprises means for deflecting a portion of the light emanating from the electric lamp 12, and projected by the parabolic reflector 11, from the normal path of the beam. In Figs. 1 to 4, this means includes a plate mirror or reflector 15, arranged directly in front of the lamp 12, so as to obscure it, and having a reflecting surface which is preferably arranged to throw a beam of light downwardly at an angle of 45° to the vertical and at an angle of 45° to the longitudinal axis of the parabolic reflector 11. The mirror 15 is provided with and secured in a metal supporting frame 16 which is adjustably mounted in a holding frame comprising a pair of substantially U-shaped clamps 17, the legs 18 of each clamp being slidably arranged in bosses 19 formed upon the metal supporting frame 16. Nuts 20 threaded upon the legs 18 provide means for holding the clamps 17 in positions wherein they will engage the headlight 10 and hold the supporting frame in any adjusted position, as clearly shown in Figs.

3 and 4. It will be noted that the clamps are adapted to engage the annular flange 21 which is usually provided upon headlights of this character, the crossbars 22 (Fig. 3) of the clamp being designed to lie in back of the flange and to engage the rear surface thereof. However, I find it desirable, because of the varying dimensions of the different makes of headlights, to provide a clamping ring 23 which is adapted to be threaded through eyes 24 formed in the U-shaped clamps 17 and rest directly upon the crossbars 22. The clamping ring 23 has one end secured in a block 25, the other end being slidably arranged in the block and threaded to receive a nut 26 whereby the ring may be tightened to increase the pressure with which the crossbars 22 engage the headlight. This construction permits the mirror 15 to be secured in a plurality of angularly adjusted positions relative to the longitudinal axis of the headlight so that the mirror may be made to project a lateral beam of light in the direction and in the manner indicated at 14', in Figs. 1 and 2. The mirror 15 on the right hand headlight 10 is positioned to throw a beam of light to the left of the vehicle, the mirror 15 on the left hand headlight 10 is positioned to throw a beam of light to the right of the vehicle. Each of these lateral beams is projected downwardly and therefore will not annoy pedestrians along the side of a roadway. It is apparent that the beam of light reflected by one of the other of the mirrors 15 will illuminate the side of the road and any path or roadway into which the vehicle may be turning, and that when positioned centrally of the headlight as shown, they will prevent glaring of the headlights. The electric lamp is always obscured and any light seen from the front is that reflected from the reflector 11. By placing the reflector in the central position shown, the central portion of the light coming from the lamp is obscured to the view of one standing in front of the headlight and is deflected to the opposite side of the car upon which the headlight is placed.

Figure 6:
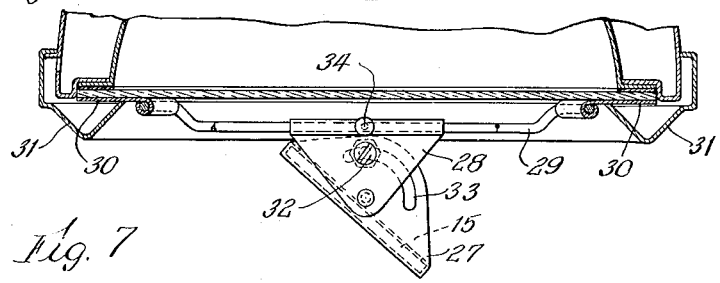
Fig. 6 is a sectional view on the line 6—6 of Fig. 5 illustrating an adjustable reflector and another form of the means for securing it to a headlight.
Figure 7:
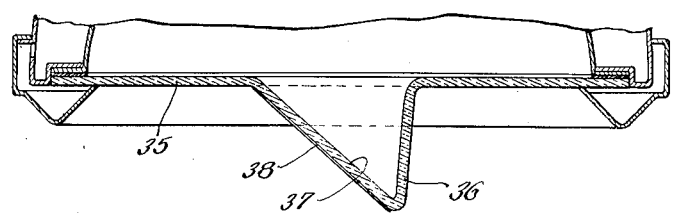
Figs. 7 and 8 are sectional views showing headlight lenses illustrating other forms of the invention.
Figure 8:
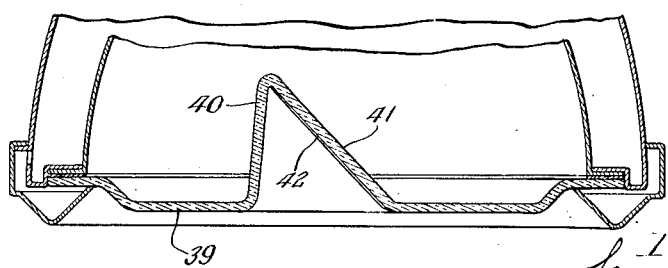

In Figs. 5 and 6, the mirror 15 is supported in a frame 27 which is pivotally mounted in side brackets 28 slidably mounted on a holding frame 29 arranged on the front of the headlight lens. Strips 30 on the holding frame project beneath the ring 31 of the headlight which holds the lens in place. Screws 32 projecting through arcuate slots 33 in the brackets engage the supporting frame 27 to secure it and the mirror 15 in adjusted position. The brackets 28 may be slidably mounted on the holding frame and secured in adjusted position by set screws 34. This adjusting means permits adjustment so that the deflected beams will clear the mud guard and makes possible the use of my device on any car regardless of the type of mud guard employed. By deflecting the rays across the front of the car I further increase their usefulness by increasing the size of the cone of light at the side of the road. In Fig. 7, the headlight lens 35 is provided with an integral outward projection 36 forming a plate 37, which is silvered or otherwise provided with a reflecting surface 38. In Fig. 8, the headlight lens 39 is provided with an integral inward projection 40 forming a plate 41 which is silvered or otherwise provided with a reflecting surface 42. The reflectors 38 and 42 of Figs. 7 and 8 are shaped and arranged to throw lateral beams in the same manner as heretofore described.

My invention will greatly facilitate driving because the supplemental reflectors will illuminate the roadway at the sides of the path of travel of the vehicle so that the driver may see the condition of the road on his right and how close he is to the edge thereof, and also see his position with relation to the middle of the road and his proximity to passing vehicles. One of the supplemental reflectors will also illuminate a side road or a cross road, into which the vehicle is turning, before the main reflectors throw their beams on it, and this is a great aid to the driver, as will be readily understood. For some purposes only one headlight may be provided with the supplemental reflector, but better general results are obtained when both headlights are so equipped.

I am aware that changes in the form, construction and arrangement of parts may be made without departing from the spirit and without sacrificing the advantages of the invention and I reserve the right to make all such changes as fairly fall within the scope of the following claims.

I claim:—

1. In combination, an automobile headlight having a lamp therein, a frame, means for securing said frame to said headlight, a shield on said frame and disposed centrally of said headlight to obscure view of said lamp from the front of said headlight, and a reflector on said shield adapted to deflect the obscured light to one side of the automobile.

2. In combination, an automobile headlight having a lamp therein, a frame, means for securing said frame to said headlight, a shield on said frame and disposed centrally of said headlight to obscure view of said lamp from the front of said headlight, a reflector on said shield adapted to deflect the obscured light to one side of the automobile, and means for fastening said securing means with said reflector in any one of a plurality of positions.

3. In combination, an automobile headlight with a lamp therein, a frame, means to secure said frame on said headlight, a shield on said frame and centrally disposed of said headlight to obscure view of said lamp from the front of said automobile, a reflector on said shield adapted to deflect the obscured light, said shield and reflector being so placed that said light is deflected towards the opposite side of the automobile from that on which said headlight is placed.

4. The combination with a headlight having a lens and a securing ring, of a reflector, a wire frame extending across the lens and engaged with the ring, means for supporting the reflector on the frame, and means for adjusting said reflector on said frame.

SAM F. KLOHS.